Oct. 14, 1969    C. D. McAULIFFE    3,472,319
METHOD OF IMPROVING FLUID FLOW IN POROUS MEDIA
Filed June 23, 1967
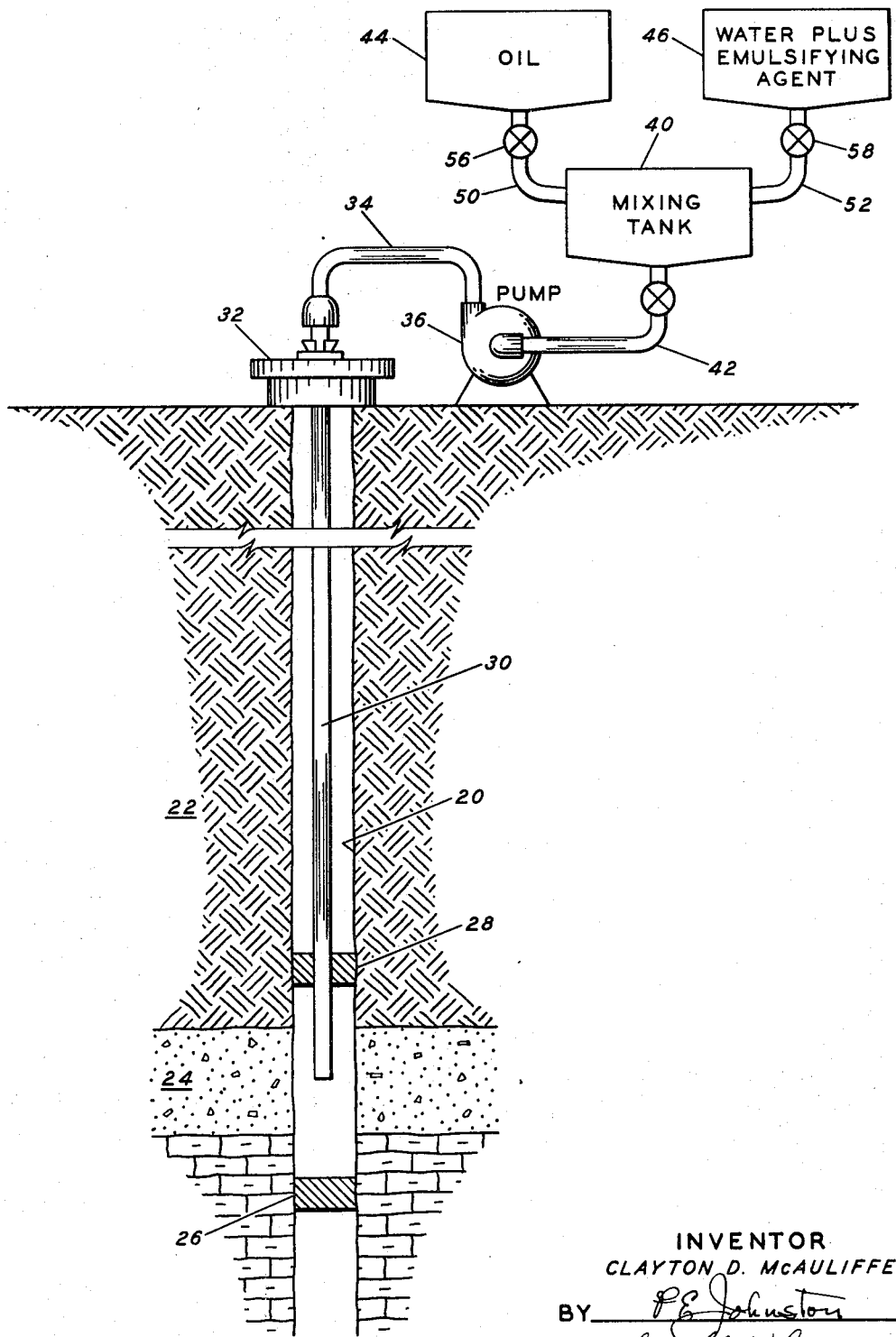
INVENTOR
CLAYTON D. McAULIFFE
BY
ATTORNEYS

United States Patent Office 3,472,319
Patented Oct. 14, 1969

3,472,319
METHOD OF IMPROVING FLUID FLOW IN POROUS MEDIA
Clayton D. McAuliffe, Fullerton, Calif., assignor to Chevron Research Company, San Francisco, Calif., a corporation of Delaware
Filed June 23, 1967, Ser. No. 648,381
Int. Cl. E21b 43/20, 33/13
U.S. Cl. 166—270    6 Claims

ABSTRACT OF THE DISCLOSURE

The invention deals with reducing flow in thief zones penetrated by a well with oil-in-water emulsions to improve the overall flow in formations penetrated by the well.

---

This invention relates to a method of improving the fluid injection profile in wells and fluid flow through porous media. More particularly, this invention relates to a method of providing more uniform flow through underground formations of different permeability by injecting an oil-in-water emulsion into the well and into the formations.

The problem of fluid loss to highly porous underground formations penetrated by a well has, of course, been long recognized. These highly porous zones are often called thief zones. In water or steam stimulation operations, for example, a serious problem is often encountered because a very small interval of the total production zone may be taking 80 percent or more of the total injected fluid. When this happens, the benefit of the injection project may be lost or greatly reduced.

In accordance with a broad aspect, the present invention involves preparing an oil-in-water emulsion and injecting the oil-in-water emulsion down a well into formations penetrated by the well and particularly into a porous thief zone. The emulsion, when prepared according to the invention, plugs or partially reduces flow in the highly porous zone to prevent undesirable fluid loss in this zone, thus assisting in redistributing the injection profile into all the formations in which it is desired to inject fluids. The oil content of the oil-in-water emulsion suitable for injection in accordance with the invention should be from about 20 to 50 volume per cent to about 75 to 80 volume percent of the total emulsion.

In accordance with one aspect of this invention the oil-in-water emulsion is prepared by adding a predetermined amount of an alkali metal hydroxide to water which is then mixed with a preselected oil to form an oil-in-water emulsion. The oils which are used are low-gravity crudes containing naturally occurring organic acids which will react with the aqueous alkali metal hydroxide solution to form surfactants which in turn form an oil-in-water emulsion.

In another form of the invention, an oil-in-water emulsion having from about 20 to 80% oil is used. The emulsion is prepared using synthetic surfactants. It is often desirable to form the emulsion with a particular crude and emulsifying agent in order to form an emulsion having oil droplets of a particular size range selected in accordance with the formation that it is desired to plug. Thus the range of sizes of the pore openings of the formation of interest is determined and then an emulsion having oil droplets of a size especially useful to plug or reduce flow in the formation is prepared. This specially sized emulsion is then injected into the formation to redistribute the injection profile in the well.

In accordance with a more particular aspect of the invention, an oil-in-water emulsion is made up in a manner so as to provide an emulsion having a low initial viscosity so that it may be easily handled and injected into the thief zone. The formulation of the emulsion is such, however, that the viscosity of the emulsion increases with time. This phenomenon is caused by swelling of the oil droplets contained in the continuous aqueous phase. When such swelling occurs after the emulsion has been injected into the formation, the swelling oil droplets tend to plug the pore openings in the formation and good overall plugging results. The controlled swelling of the oil droplets in the water is achieved by making up the emulsion in such a manner to cause transfer of a portion of the external, continuous phase water into the oil droplets of the emulsion. The oil which is emulsified contains a small amount of internal connate water which has a relatively high salt content such as for example about 1% total salt content. The salt content of the external, continuous phase water is adjusted to have a relatively low salt content such as for example below about .05% total salt content. The emulsion is prepared in such a way so as not to disturb the internal water contained in the oil droplet. After the emulsion is so prepared, a relatively slow transfer of external phase water is made to the internal water, thus causing the oil droplets to swell. When the emulsion is prepared and injected into the formation in proper time sequence, an improved plugging job will result. This aspect of the invention has been found to be particularly useful in steam and hot water injection wells when it is desired to redistribute the injection profile in these wells, especially when the emulsion is prepared with a base and an oil having naturally occurring surfactants since a particularly stable emulsion results.

It is a particular object of the the present invention to provide a process for improving the injection profile and the flow of fluids through porous formations penetrated by a well by injecting specially prepared oil-in-water emulsions into a well penetrating the formations. Further objects and advantages of the present invention will become apparent from the following detailed description, read in light of the accompanying drawing which is made a part of this specification and which is a view partially in section illustrating a preferred form of apparatus assembled in accordance with the present invention.

Referring specifically now to the drawing, a well 20 penetrating an earth formation 22 is shown. The well 20 has penetrated a streak or zone 24 of high permeability which might, for example, be taking all, or nearly all, of the fluids injected into the well. The well is preferably provided with packing means 26 and 28 to isolate the highly porous formation 24. Tubing string 30 provides fluid communication from the surface through the wellhead 32 to the porous formation 24. Suitable surface tubing 34 connects tubing string 30 with the discharge of pump 36.

A mixing tank 40 is connected to the intake of the pump 36 by tubing 42. The mixing tank 40 receives the materials for preparing the emulsion in accordance with the present invention from means 44 defining a source of oil and means 46 defining a source of water plus a suitable emulsifying agent to cause the oil to emulsify in the water. Appropriate tubing 50 and 52 having adjustable valves 56 and 58, respectively, provides for the flow of the components to the tank 40.

In accordance with a broad aspect of the present invention, an oil-in-water emulsion is prepared by suitable means. The dispersed oil phase of the oil-in-water emulsions can range from extremely low values by dilution to over 90% oil, although close packing of uniform spherical droplets occurs at 74% of the volume and therefore theoretically an oil-in-water emulsion should invert to a water-in-oil emulsion if the disperse phase becomes larger than 74%. The percentage may exceed this amount because the droplet size in emulsions usually covers a wide size range distribution and the smaller droplets can fit within the interstices of the larger droplets, and also because spherical droplets can deform and become polyhedral in shape.

The emulsions formed in accordance with the invention are stable enough so thtey do not readily invert to water-in-oil emulsions which are extremely viscous and very difficult to handle and not useful in the present invention. An emulsion prepared in accordance with this invention is injected down a well and into a highly porous formation. Generally a problem arises when a particular zone of oil-bearing formation is taking an inordinate amount of fluids in an injection project. For example, in water drive secondary recovery processes a small interval may be taking virtually all the water which is injected into the formation. The oil-in-water emulsion of the present invention when injected into such a formation will tend to go to the more permeable intervals and by virtue of the oil droplets becoming lodged in these highly permeable portions of the formation, will tend to plug or reduce flow into these highly permeable zones and to thus redistribute the injection profile of the well.

Oil-in-water emulsions formed in accordance with the invention are deep penetrating plugging agents for use in plugging thief intervals. The emulsions are effective because of their ability to restrict flow into the more permeable zones. As fingering develops or has been developed during a water flood, a greater amount of emulsion will enter the fingered zones as the emulsion moves into a formation. As an oil droplet from the emulsion enters a pore restriction of the formation which is smaller than the droplet, the radius of curvature of the entering portion of the droplet is smaller than the radius of the portion of the drop in the pore. Thus the capillary pressure is greater at the front of the drop than at the back and pressure is required to force the droplet through the pore restriction. As more droplets encounter more pore restrictions, greater restriction to flow occurs with the result the fluid begins to flow into less permeable zones.

For an emulsion to be effective, the droplets of oil-in-emulsion should be slightly larger than the pore throat retsrictions in the porous medium. A demonstration was conducted to show this effect. A core in a laboratory flow apparatus had a permeability to water of 1600 millidarcies. The core was first flooded with an oil-in-water emulsion having average droplet diameters of 12 microns. The pressure drop across the core was 10 p.s.i./ft. The core was cleaned, saturated with water and flooded with an oil-in-water emulsion having average droplet diameters of 1 micron. The pressure across the core was the same in both floods. Table I below shows that the apparent permeability was reduced to a greater extent with the emulsion having larger droplets than emulsion having smaller droplets.

TABLE I.—PERMEABILITY REDUCTION OF 1,600 md. CORE FLOODED WITH OIL-IN-WATER EMULSIONS

| Pore Volumes of Fluid Injected | Apparent Permeability, md. | |
|---|---|---|
| | Emulsion with $12\mu$ Average Droplet diameter | Emulsion with $1\mu$ average droplet diameter |
| 1 | 780 | 1,275 |
| 2 | 400 | 1,150 |
| 3 | 275 | 1,100 |
| 4 | 165 | 1,050 |
| 6 | 90 | 950 |
| 8 | 50 | 925 |
| 10 | 90 | 900 |

Once an oil-in-water emulsion formed in accordance with the invention enters a porous formation, it remains stable and many pore volumes of water can follow the emulsion with no marked change in apparent permeability. In addition, oil-in-water emulsions tend to have the viscosity of the continuous water phase. Oils having viscosity as high as one million centipoises when emulsified in water with 70% oil content have emulsion viscosities typically on the order of 200 centipoises. When reduced to 50% oil content the emulsions typically have viscosities of from 10–15 centipoises. Oil-in-water emulsions are thus easily prepared and injected into wells without high-viscosity problems or high-pressure drops. However, as indicated above, oil-in-water emulsions flow reluctantly through porous media because of the described phenomena.

Oil-in-water emulsions flowing through porous formations also have another property which is advantageous in the use of oil-in-water emulsions as deep penetrating plugging agents. Oil-in-water emulsion flow through porous formations is non-Newtonian, that is, the emulsion flows easier with a high-pressure drop than with a low-pressure drop. This non-Newtonian effect is advantageous in the injection of an oil-in-water emulsion into a porous formation. The largest change in pressure for unit distance occurs at the well bore because radial flow pressure drop per unit distance decreases logarithmically as distance from the injection well increases. Thus emulsions can be injected into the formation easily and will more effectively reduce permeability in the reservoir away from the well bore.

A field test to demonstrate the effectiveness of oil-in-water emulsions in reducing thief zone permeability has been conducted. In a water flood of an oil-bearing formation, salt water was injected for nine months. At the end of this time the nearest observation well was completely watered out producing no oil and 100% salt water. Fresh water was then injected into the injection well for two months and at the end of this time the observation well was producing 70% fresh water and 30% salt water. An oil-in-water emulsion was then injected into the injector at a rate of about one barrel of emulsified oil per vertical foot of reservoir. At the end of one week seven barrels of oil per vertical foot of reservoir had been injected. An additional seven barrels of emulsified oil per vertical foot were injected over the next four-day period. The emulsion was injected in fresh water and fresh water followed the emulsion injection. Two days after emulsion injection was started, the salinity of the water in the observation well started to increase and after two weeks of observation well was pumping only 30% fresh water. Thus, the emulsion reduced the thief zone permeability and the direct flow of fresh water from the injector to the observation well was drastically reduced.

In general, the oil-in-water emulsions for use in the invention contain by volume between about 20 to 80 percent oil based on the total emulsion. The emulsions are formed and are stable when sufficient emulsifying agents are present to orient at the oil-water interface to form a film. The emulsifying agents are compounds which have long hydrocarbon chains which are soluble in oil and polar groups such as carboxylate, sulfonate, ether or alcohol which are soluble in water. The emulsifying agents may be naturally occurring agents in the crudes which can be activated or they may be independent synthetic emulsifying agents that can be added to the crude.

Many asphaltic crude oils contain sufficient natural emulsifiers to form oil-in-water emulsions when the crude is mixed with a dilute aqueous solution of a suitable base. Emulsions formed in this manner are especially advantageous because they do not break easily when subjected to heat. Dilute aqueous solutions of the alkali metal hydroxides such as NaOH, KOH, and LiOH are suitable for forming very stable oil-in-water emulsions with many asphaltic crudes. The aqueous continuous phase of the emulsion contains a base in a concentration within about the range 0.002 N and 0.75 N. The viscosity of the emulsion can be varied by adjusting its water content, the viscosity being lowered with increased water content and increased by raising the oil content. As indicated, the invention is particularly adapted to the use of asphaltic crudes—for example, the heavy California crudes—which upon suitable mixing with an aqueous basic solution are converted into an oil-in-water emulsion. It has been found that by adding crude to an aqueous solution of a base—for example, sodium hydroxide—an oil-in-water emulsion is formed by the reaction of the base with the saponifiable constituents of the crude.

The base used in forming the aqueous alkaline solution can be a metal alkaline hydroxide, such as sodium hydroxide, potassium hydroxide, lithium hydroxide or ammonium hydroxide. In addition to the inorganic bases, it is also possible to use strong organic bases, such as the amines—for example, ethylamine, propylamine, triethanolamine—thus forming emulsifying amine soaps with the acid contained in the asphaltic crude oil. Generally, because of cost, it is preferred to use a caustic solution formed of sodium hydroxide or ammonium hydroxide.

Various crude oils have different susceptibilities to form the desired oil-in-water emulsions required for use in accordance with the present invention. Specifically, it is desirable to evaluate the crude oil for its ability to form the desired emulsion prior to mixing sodium hydroxide or other alkali metal hydroxide solutions with the crude to form the prescribed oil-in-water emulsion. Taking sodium hydroxide as representative, several examples of crude will be given below to indicate suitable concentration ranges of base to form a desirable oil-in-water emulsion. Generally, the emulsions are most readily formed by crude oils having high acid numbers. The emulsion is also more easily formed with "fresh" water whose salt content is low. If a native or connate water from the formations producing oil has a high salt content, it is sometimes necessary either to supply quantities of fresh water from the surface or to remove some of the connate water from the oil.

Table II illustrates effective ranges of sodium hydroxide in weight percent concentration in the aqueous phase which have been used to emulsify samples of crude oil to form oil-in-water emulsions. The oil phase was maintained at about 70 percent by volume to produce oil-in-water emulsions from crude oils over the given preferred ranges.

There are a number of crude oils which will form suitable emulsions when mixed with water solutions of alkaline metal hydroxide. These crude oils, as a class, are usually low API gravity, asphaltic oils, and the ease with which they are emulsified depends on the quantity of the naturally occurring organic acids in the oil and the concentrations and kinds of salts in the water used to prepare the emulsion. Typical examples of suitable oils including the amount of coproduced water contained therein and suitable NaOH ranges that are useful to form oil-in-water emulsions are set out in Table III. The stable oil-in-water emulsions set out in Table II contain 70 percent oil. If it is desired to prepare an emulsion with a lesser oil content, say 40%, a 70% emulsion may be first prepared using the concentration shown in Table III and the additional water added to obtain the desired oil/water ratio. For a given oil and oil field, the sodium hydroxide concentration range for stable oil-in-water emulsions narrows as the percentage of coproduced formation water increases. For example, compare Casmalia B oil with Casmalia A and D oils.

TABLE III.—RANGE OF SODIUM HYDROXIDE CONCENTRATIONS WHICH PRODUCE 70 PERCENT OIL-IN-WATER EMULSIONS WITH SANTA MARIA VALLEY CRUDE OILS

| | Coproduced water in crude, percent | Percent NaOH in water phase which gives good emulsions |
|---|---|---|
| Field: | | |
| Casmalia A | 6.5 | 0.2-0.5 |
| Casmalia B | 13.1 | 0.2-0.3 |
| Casmalia C | 1.8 | 0.05-0.5 |
| Casmalia D | 0.8 | 0.1-0.5 |
| Casmalia E | 4.0 | 0.2-0.5 |
| Cat Canyon A | 7.7 | 0.2-1.0 |
| Cat Canyon B | 3.8 | 0.1-1.0 |
| Cat Canyon C | 15.7 | 0.2-0.5 |
| Zaca | 19.6 | 0.1-0.2 |

As is shown in Table IV, below, the salt content of the external water phase has a marked effect on the concentration of NaOH required to produce stable emulsions. All formulations were 70 percent oil and 30 percent water. Water percentages are based upon 30 percent as 100.

TABLE IV.—EMULSIFICATION OF SANTA MARIA VALLEY CRUDE OILS IN FORMATION WATERS

| Field | Waters used in formulation | Total salinity of water, percent | Result |
|---|---|---|---|
| Casmalia A | 57% Casmalia A, 43% Distilled | 0-1.94 | Stable emulsion using 0.2, 0.3% NaOH. |
| Casmalia B | 100% Casmalia B | 1.94 | Did not emulsify. |
| Casmalia C | 100% Casmalia C | 1.49 | Fairly stable emulsion with 0.5% NaOH. |
| Casmalia D | 100% Casmalia D | 1.32 | Did not emulsify. |
| Cat Canyon B | 100% Cat Canyon B | 0.33 | Stable emulsion with 0.5% NaOH. |
| Cat Canyon C | 100% Cat Canyon C | 0.27 | Do. |
| Cat Canyon B | 10% Cat Canyon B, 90% Casmalia | 0.33-1.94 | Did not emulsify. |
| Cat Canyon C | 43% Cat Canyon C, 57% Casmalia | 0.27-1.94 | Do. |
| Zaca | 57% Chamberlin, 43% Distilled | | Stable emulsion with 0.1, 0.2% NaOH. |

TABLE II

| Crude oil: | NaOH conc., weight percentage in water |
|---|---|
| Midway-Sunset A | 0.4-1.4 |
| Midway-Sunset B | 0.05-0.5 |
| Midway-Sunset C | 0.1-1.0 |
| West Coalinga A | 0.05-1.0 |
| West Coalinga B | 0.1-0.5 |
| Boscan | 0.05-0.3 |
| Casmalia | 0.1-0.6 |
| Cat Canyon | 0.1-1.0 |

Table V illustrates the viscosity increase with time of oil-in-water emulsions prepared from Casmalia crude oil by hand stirring. The amount of hand stirring imparted was just enough to cause formation of the emulsion. This requires a relatively small amount of shear energy. This is contrasted with shaking the mixture to prepare emulsions with a wrist-action paint shaker which imparts a relatively large amount of shear energy to the emulsion. The energy imparted to the oil and water is low enough to prevent loss of connate water from the oil droplets. The upper limit of mixing energy can easily be determined from tests.

TABLE V.—VISCOSITY INCREASE WITH TIME OF OIL-IN-WATER EMULSION PREPARED FROM CASMALIA CRUDE OIL BY HAND STIRRING

| | Percent formation water in crude | Total salt content of internal water | Percent oil in emulsion | Percent NaOH in water phase [1] | Date | Hour | Viscosity in cp. at 25° C. at a shear rate of 7.6 sec.$^{-1}$ | Lapsed time |
|---|---|---|---|---|---|---|---|---|
| Type of Casmalia crude sample: | | | | | | | | |
| C | 1.8 | 1.49 | 68.8 | 0.2 | 5-19 | | 240 | |
| | | | | | 7-7 | | 2,850 | 49 days. |
| A | 6.5 | 1.94 | 70.0 | 0.2 | 2-10 | | 260 | |
| | | | | | 6-23 | | 2,800 | 133 days. |
| | | | | | 5-20 | (0945) | 650 | |
| B | 13.1 | 1.94 | 70.0 | 0.2 | 5-20 | (1545) | 1,400 | 6 hours. |
| | | | | | 5-21 | (1840) | 2,900 | 23 hours. |
| | | | | | 5-23 | | (2) | 3 days. |
| | | | | | 5-26 | (1000) | 80 | |
| B | 13.1 | 1.94 | 60.0 | 0.2 | 5-26 | (1530) | 860 | 5½ hours. |
| | | | | | 5-27 | (0800) | 2,731 | 22 hours. |
| | | | | | 5-29 | | (2) | 3 days. |

[1] Additional water added was distilled.
[2] Too high to measure.

TABLE VI.—EFFECT OF SODIUM HYDROXIDE AND SODIUM CHLORIDE ON THE PREPARATION, STABILITY, AND VISCOSITY OF OIL-IN-WATER EMULSIONS OF CASMALIA C OIL

| Chemical Content of Water Phase | | Emulsion Prepared and Initial Viscosity, cp. at— | | | | | Viscosity Remeasured After About One Month | | | | |
|---|---|---|---|---|---|---|---|---|---|---|---|
| | | | | | Shear Rates, sec.$^{-1}$ | | | | | Shear Rates, sec.$^{-1}$ | |
| NaOH, percent | NaCl, percent | Date 1965 | Temp., °C. | 7.6 | 260 | 760 | Date 1965 | Temp., °C. | 7.6 | 260 | 760 |
| 0.05 | 0.0 | 4-29 | 27.5 | 117 | 76 | 72 | 5-20 | 25.5 | 1,925 | | |
| 0.05 | 0.1 | 5-5 | 29.0 | 120 | 115 | 85 | 5-20 | 27.0 | 200 | 150 | 110 |
| 0.05 | 0.2 | 5-5 | 28.0 | 125 | 130 | 115 | 5-20 | 25.9 | 150 | 170 | 107 |
| 0.05 | 0.3 | 5-5 | 29.5 | 170 | 145 | 100 | 5-20 | 26.1 | 150 | 155 | 85 |
| 0.05 | 0.4 | 5-6 | 29.8 | 135 | 130 | 90 | 5-20 | 27.0 | 100 | 110 | 60 |
| 0.05 | 0.5 | 5-6 | 29.2 | 140 | 125 | 95 | 5-20 | 27.1 | 75 | 96 | 65 |
| 0.05 | 0.6 | 5-6 | 27.8 | 130 | 120 | 85 | 5-20 | 27.0 | 100 | 90 | 60 |
| 0.05 | 0.7 | 5-7 | 29.0 | 50 | 67 | [1] 60 | 5-20 | 27.3 | 75 | 80 | [1] 65 |
| 0.05 | 0.8 | | | (Did not emulsify) | | | | | | | |
| 0.2 | 0.0 | 4-30 | 25.0 | 7,750 | | | 5-21 | 25.1 | 7,180 | | |
| 0.2 | 0.1 | 4-30 | 27.5 | 950 | 250 | | 5-21 | 25.5 | 975 | 290 | |
| 0.2 | 0.2 | 5-3 | 24.5 | 780 | 230 | | 5-21 | 25.9 | 460 | 190 | |
| 0.2 | 0.3 | 5-3 | 27.0 | 800 | 245 | | 5-24 | 24.2 | 500 | 170 | |
| 0.2 | 0.4 | 5-3 | 27.0 | 650 | 220 | | 5-24 | 25.5 | 400 | 150 | |
| 0.2 | 0.5 | 5-4 | 26.5 | 300 | 185 | 110 | 5-24 | 24.0 | 100 | 85 | 70 |
| 0.2 | 0.6 | 5-4 | 27.0 | 275 | 164 | 120 | 5-24 | 26.5 | 230 | 140 | 145 |
| 0.2 | 0.7 | 5-4 | 29.0 | 235 | 120 | [1] 80 | (Emulsion broken) | | | | |
| 0.2 | 0.8 | 5-5 | 28.0 | 465 | 270 | [1] 150 | (Emulsion broken) | | | | |
| 0.2 | 0.9 | | | (Did not emulsify) | | | | | | | |
| 0.5 | 0.0 | 4-30 | 26.0 | 1,710 | | | 5-24 | 25.3 | 2,910 | | |
| 0.5 | 0.1 | 4-22 | 28.0 | 1,235 | 280 | | 5-24 | 25.9 | 1,200 | | |
| 0.5 | 0.2 | 4-22 | 28.0 | 807 | 250 | | 5-24 | 26.0 | 325 | 140 | [1] 115 |
| 0.5 | 0.3 | | | (Did not emulsify) | | | | | | | |
| | | Emulsion Prepared With Waring Blender (5 min.) | | | | | | | | | |
| 0.2 | 0.0 | 5-18 | 26.5 | 6,600 | | | | | | | |
| 0.5 | 0.0 | 5-18 | 27.0 | 1,870 | | | | | | | |

[1] Erratic viscometer reading, probably due to lumpy condition of emulsion.

As shown in Table V above, the oils used contained between 1.8 to 13.1 percent coproduced water. The coproduced water is contained in the oil droplets in the form of a water-in-oil emulsion. Note that even the viscosity of the Casmalia C which contains only 1.8 percent coproduced water increased markedly with respect to time. Striking examples of marked increase in viscosity with time occurred when an appreciable amount of coproduced water exists in the oil as is shown for Casmalia B for both 60 and 70 percent oil-in-water emulsions. After only a few hours, a marked viscosity increase occurred; and, after three days, the viscosity was too high to measure with the Fann viscometer. After a week or 10 days, the emulsion will only flow very slowly as the emulsion is poured.

The explanation for this increase in viscosity of the above oil-in-water emulsions is believed to be in the osmotic transfer of external phase water to the internal water contained in the oil droplets. This is particularly noticeable if the external water is distilled or of low salinity. In these cases, a large, osmotic potential exists between the external water and the high salinity connate water emulsified within the oil droplets. With time, the external water passes into the oil droplets to join the internal water, thus causing the oil droplets to increase in size. This results in an overall size increase of the oil droplets with an apparent increase in the overall percentage of the oil-in-water emulsion. In order to give suitable viscosity increases the total salt content of the internal phase water is at least two times greater than the salinity of the external water.

Thus swelling of the oil droplets and increase in viscosity are obtained in these oils by: (1) preparing the oil-in-water emulsions from suitable crude oils using low salinity external water and low shear energy inputs; and (2) if necessary, adjusting the salt content of the external aqueous phase to a level below the salt content of the internal water phase. Table VI contains data illustrating the effect of sodium hydroxide and sodium chloride on the preparation stability and viscosity of oil-in-water emulsions on Casmalia C oil. It is shown that the viscosity increase with time is assisted by decreasing the salt concentration of the external phase water. The emulsions were formulated with 70 percent Casmalia C oil containing 1.8% coproduced water (actual oil in emulsion—68.8%), distilled water, NaOH, and NaCl as indicated. Emulsions were prepared by shaking in glass bottles, at room temperature on wrist-action paint shaker for ten minutes. All viscosities were measured with a Fann viscometer. A dashed line in the table indicates the emulsion viscosity was outside the range of the viscometer for that respective shear rate.

Thus, in accordance with a specific aspect of the invention, an oil-in-water emulsion is prepared by mixing an aqueous alkaline metal hydroxide solution with a crude oil selected for its ability to emulsify in said aqueous metal hydroxide solution. A minimum of shear energy is used to form the emulsion to maintain connate water in the oil droplets. The salt content of the external water phase is kept below a predetermined level, usually less than 0.5 percent total salt equivalent to insure that osmotic transfer of external phase water to the internal phase water of the crude will occur with time, thus causing the oil droplets to swell. This initial low viscosity emulsion is injected into a porous thief zone and caused to remain in the zone for a time period sufficient to permit the osmotic transfer of the external phase water into the oil droplets to swell the oil droplets and provide more efficient plugging of the zone. In some formations, depending on the connate water present in the formation, it may be necessary to inject water having low salinity content prior to injecting the oil-in-water emulsion. This is so because the salt content of some formation water may be in excess of the allowable salinity content for osmotic transfer to occur. The relatively fresh water placed in the formation prior to injecting the emulsion can transfer to the oil droplets to cause them to swell.

In a typical well which penetrates a zone which is taking a disproportionate amount of injected fluid, the zone may or may not have to be packed off depending on a variety of conditions. In either event, an oil-in-water emulsion is prepared in accordance with the above description. The emulsion is preferably prepared in a manner so that the viscosity will increase with time. Generally it is desirable to have the emulsion thicken to the point where it will barely pour at 75° F. in about 24 to 48 hours. The emulsion is injected down the well and into the thief zone interval. The amount of emulsion which should be injected will, of course, vary with the type and size of the thief interval; however, from 10 barrels of emulsion per vertical foot of thief zone to 100 barrels of emulsion per foot of thief zone are usually suitable. From 20 to 50 barrels per vertical foot of thief zone is a particularly desirable range in most applications. Since the initial viscosity of the emulsion is low, the emulsion is easily injected into the well with conventional equipment using techniques well known in the art.

It is apparent that modifications other than those described herein may be made to the method of this invention without departing from the inventive concept. It is intended that the invention embrace all equivalents within the scope of the appended claims.

I claim:
1. A method of redistributing the injection profile in a well penetrating a thief zone comprising the steps of contacting an asphaltic crude with water in the presence of a base and an emulsifying agent to form an oil-in-water emulsion having an oil content of from 20 to 80% and injecting said emulsion down said well into said porous thief zone to reduce flow into said thief zone.

2. The method of claim 1 further characterized in that the oil droplets in the emulsion are larger than the pore restrictions of the thief zone.

3. The method of claim 1 where from 10 to 100 barrels of emulsion are injected per vertical foot of thief zone.

4. The method of claim 1 where the base is a dilute aqueous solution of an alkali metal hydroxide.

5. The method of claim 4 where the alkali metal hydroxide is sodium hydroxide.

6. A method of reducing flow into a porous thief zone penetrated by a well comprising the steps of selecting an oil containing at least about 1% coproduced water emulsified therein, said coproduced water having a total salinity of at least about 1%, mixing said oil with additional water and a base in the presence of an emulsifying agent for said oil using a minimum of shear energy to maintain connate water in the oil droplets, said additional water having a total salt content of less than about .5%, to form an oil-in-water emulsion having an oil content between 20 and 80%, injecting said oil-in-water emulsion down said well into the porous thief zone and maintaining said oil-in-water emulsion in said thief zone adjacent said well for a period of time sufficient to allow the oil droplets to swell to at least partially plug said porous thief zone to assist in redistributing the injection profile of said well.

References Cited

UNITED STATES PATENTS

| | | | |
|---|---|---|---|
| 2,713,032 | 7/1955 | Tailleur | 252—8.5 |
| 2,742,426 | 4/1956 | Brainerd | 166—42 X |
| 2,773,031 | 12/1956 | Tailleur | 252—8.5 |
| 3,174,542 | 3/1965 | Reisberg | 166—9 |
| 3,208,515 | 9/1965 | Meadors | 166—9 |
| 3,208,517 | 9/1965 | Binder et al. | 166—9 |
| 3,353,600 | 11/1967 | Annis et al. | 166—30 |
| 2,988,142 | 6/1961 | Maly | 166—9 |
| 3,261,400 | 7/1966 | Elfrink | 166—30 |

STEPHEN J. NOVOSAD, Primary Examiner

U.S. Cl. X.R.

166—273, 294